United States Patent [19]

van Abeelen

[11] 4,358,556

[45] Nov. 9, 1982

[54] HIGH IMPACT, HIGH MODULUS FIBER REINFORCED AROMATIC CARBONATE POLYMERS

[75] Inventor: Petrus C. A. M. van Abeelen, Gilze, Netherlands

[73] Assignee: General Electric Company, Pittsfield, Mass.

[21] Appl. No.: 214,010

[22] Filed: Dec. 8, 1980

[51] Int. Cl.$^3$ .............................................. C08K 5/54
[52] U.S. Cl. .................................. 524/267; 524/442; 524/443; 524/494; 524/505; 524/534; 525/92
[58] Field of Search ............ 260/37 PC, 42.17, 42.26; 525/88, 92; 524/267, 442, 443, 505, 534, 494

[56] References Cited

U.S. PATENT DOCUMENTS

| | | | |
|---|---|---|---|
| 3,577,378 | 5/1971 | Streib et al. | 260/37 PC |
| 3,639,331 | 1/1972 | Hattori et al. | 260/31.8 R |
| 3,751,519 | 8/1973 | Bostick et al. | 260/29.1 R |
| 3,933,730 | 1/1976 | Hoogeboom | 260/37 PC |
| 3,971,756 | 7/1976 | Bialous et al. | 260/45.7 R |
| 4,122,131 | 10/1978 | Bussink et al. | 260/37 PC |
| 4,147,707 | 4/1979 | Alewelt et al. | 260/37 SB |
| 4,197,232 | 4/1980 | Bialous et al. | 260/37 PC |

*Primary Examiner*—J. Ziegler
*Attorney, Agent, or Firm*—Hedman, Casella, Gibson & Costigan

[57] ABSTRACT

High impact, high modulus thermoplastic molding compositions comprise
  (a) an aromatic carbonate polymer;
  (b) a fibrous reinforcing agent essentially free of any sizing agent; and
  (c) a small amount of a polysiloxane having a substantial content of Si-H bonds.

12 Claims, No Drawings

HIGH IMPACT, HIGH MODULUS FIBER REINFORCED AROMATIC CARBONATE POLYMERS

This invention is directed to an improved polycarbonate composition of an aromatic carbonate polymer in intimate admixture with an unsized fibrous reinforcing agent and a small amount of a hydrogen siloxane.

BACKGROUND OF THE INVENTION

Incorporating fibrous reinforcements, such as glass fibers and rock wool fiber, into polycarbonate resins is known to improve dimensional stability, heat distortion temperature, creep resistance, tensile strength and, most dramatically, elastic modulus. However, this always results in a serious deterioration in overall ductility, manifested in poor notched and unnotched impact strength as well as a decreased falling ball impact strength. Even small amounts of fibrous reinforcements have a serious effect on the ductility of polycarbonate. If it is sought to improve impact performance by adding conventional impact modifiers, such as selectively hydrogenated styrene-butadiene-styrene block copolymers, then there is a detrimental affect on stiffness (modulus) and only a minor improvement in impact strength, in any event. It has been found that elimination of the adhesive bond between polycarbonate and fibrous reinforcing agents can be accomplished by burning off or otherwise using fibers free of conventional sizing or coupling agents. This does improve ductility, but only for relatively small fiber contents, e.g., up to less than about 10% by weight of sizing-free glass fibers in the polycarbonate—this is usually below the optimum amount.

It has now been discovered that the addition of poly $C_1$-$C_{10}$ alkyl (or phenyl) hydrogen siloxanes to compositions comprising "pristine" (or sizing-free) fibrous reinforcements and polycarbonates, in which the fiber content exceeds even 30%, results in a tremendous improvement in falling ball (ductile) impact strength, and notched impact and unnotched impact strengths, too. These can be improved by several hundred percent with almost full retention of the elastic modulus.

The foregoing is altogether surprising in light of Alewelt et al., U.S. Pat. No. 4,147,707, who describe glass fiber reinforced polycarbonates with improved mechanical properties containing 0.5 to 5.0% of organopolysiloxane. While the '707 patent states that both long and short glass fibers can be used, Col. 3, lines 22-50, it is specified that they must be "provided with a polycarbonate-compatible finish by means of suitable sizes" (Col. 3, lines 25-27). The patent makes no distinction between conventional silicones, like polydimethyl siloxanes, and those containing silicone-hydrogen bonding. Applicant finds superior results with unsized glass fibers, if a hydrogen-siloxane is selected, and then used in amounts below 1.0%, and especially below the 0.5% lower limit of Alewelt et al. The falling ball ductile impact with such specific hydrogen polysiloxanes is, as will be illustrated later, more than ten times greater than the dimethylpolysiloxanes used in Alewelt et al. Bialous et al., U.S. Pat. No. 3,971,756 is also relevent to the present invention, but only insofar as it shows that from 0.01 to about 5 weight % of a polysiloxane having silicon-bonded hydrogens can be used to prevent dripping in flame retardant polycarbonate compositions. Although the amounts and types of hydrogen siloxanes suggested in the '756 patent are within the limits employed herein, and the inclusion of fibrous glass is suggested, the need for sizing-free fibers to enhance ductile impact is not at all evident.

It is believed that the following conditions are essential herein:

(i) sizing agents (on the fibrous reinforcement or separately added) must be absent because these either evoke adhesive bonds between the matrix and fiber, or they prevent reactions between the hydrogen polysiloxane and the fiber, or both;

(ii) a very good dispersion of the fibers in the matrix is required;

(iii) for best combination of high modulus and creep performance, the addition of polysiloxane is preferably kept below 1.0% and, especially preferably, below 0.5%; and (iv) the polysiloxane used must contain hydrogen silicon bonds.

Following the use, especially, of short glass fibers, additional advantages in improved isotropy and high surface quality are obtained. It is again re-emphasized, that sizing agents must not be present to contribute to adhesive bonds between matrix and fibers, nor should they prevent reactions between the silicon-hydrogen bond-containing polysiloxane and the fibers. In practical terms this means that pristine fibers should be used. Using the factors mentioned above, the falling dart impact strength of a 30% short glass fiber-reinforced polycarbonate can be increased from 0.1 kgm to 6 kgm, while the unnotched impact bar does not even break. The new composition has a desirable high modulus. These results are evident at surprisingly low levels of hydrogen polysiloxane. Substantially the same results are also obtained with other fibrous fillers, pristine or virgin, including rockwool-mineral fibers, carbon fibers, and the like.

SUMMARY OF THE INVENTION

According to the present invention, these are provided high impact strength, high modulus thermoplastic compositions comprising per 100 parts by weight (a), (b) and (c), an intimate admixture of:

(a) from about 95 to about 35 parts by weight of an aromatic carbonate polymer or copolymer;

(b) from about 5 to about 65 parts by weight of a fibrous reinforcing agent essentially free of any sizing agent; and (c) from about 0.05 to about 4 parts by weight of a hydrogen siloxane comprising units of the formula

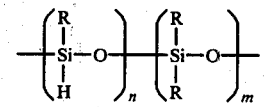

wherein R is hydrogen, $C_1$-$C_{10}$ alkyl, phenyl or a mixture of any of the foregoing, and n plus m is at least 4, and, for example, up to about 200.

DETAILED DESCRIPTION OF THE INVENTION

The term "aromatic carbonate polymer or copolymer" is used in its broader aspects. Suitable are those described in the above-mentioned U.S. Pat. Nos. 3,971,756 and 4,147,707, the disclosures of which are incorporated herein by reference. The aromatic carbonate polymers are homopolymers and copolymers that are prepared by reacting a dihydric phenol with a carbonate precursor. Suitable dihydric phenols are bis(4-hydroxyphenol)methane; 2,2-bis(4-hydroxyphenyl)propane (hereinafter referred to as bisphenol-A); 2,2-bis(4-hydroxy-3-methylphenyl)propane; 4,4-bis(4-hydroxyphenyl)heptane; 2,2-bis(4-hydroxy-3,5-dichlorophenyl)-propane; 2,2-bis(4-hydroxy-3,5-dibromophenyl)propane; 2,2-bis(4-hydroxy-3,5-dimethylphenyl)propane, and the like; dihydric phenol ethers usch as bis(4-hydroxyphenyl)ether, and the like; dihydroxydiphenyls, such as p,p'-dihydroxydiphenyl; 3,3'-dichloro-4,4'-dihydroxydiphenyl, and the like; dihydroxyaryl sulfones, such as bis(4-hydroxyphenyl)sulfone; bis(3,5-methyl-4-hydroxyphenyl)sulfone, and the like; dihydroxybenzenes; resorcinol; hydroquinone, halo- and alkyl-substituted dihydroxybenzenes, such as 1,4-dihydroxy-2,5-dichlorobenzene; 1,4-dihydroxy-3-methylbenzene, and the like; and dihydroxy diphenyl sulfoxides, such as bis(3,5-dibromo-4-hydroxyphenyl)sulforide, and the like. A variety of additional dihydric phenols arealso available to provide carbonate polymers and are disclosed in U.S. Pat. Nos. 2,999,835; 3,028,365; and 3,153,008. Also suitable for use as the aromatic carbonate polymer component (a) are copolymers prepared from any of the above copolymerized with halogen-containing dihydric phenols, such as 2,2-bis(3,5-dichloro-4-hydroxyphenyl)propane; 2,2-bis(3,5-dibromo-4-hydroxyphenyl)propane, and the like. It is contemplated to employ two or more different dihydric phenols or a copolymer of a dihydric phenol with a glycol or with hydroxy or acid terminated polyester, or with a dibasic acid in the event that a carbonate coplymer or interpolymer rather than a homopolymer is desired for use as component (a). Also contemplated for use are blends of any of the above aromatic carbonate polymers. Especially preferred dihydric phenols are bisphenol-A and 2,2-bis(4-hydroxy-3,5-dimethylphenyl)propane.

The carbonate precursor may be either a carbonyl halide, a carbonyl ester or a haloformate. The carbonyl halides which may be employed include carbonyl bromide, carbonyl chloride and mixtures thereof. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, and the like; di(alkylphenyl)carbonate, such as di(tolyl)carbonate, di(naphthyl)carbonate, di(chloronaphthyl)carbonate, and the like, or mixtures thereof. The haloformates of dihydric phenols are (bischloroformates of hydroquinone, etc.), or glycols (bis haloformates of ethylene glycol, neopentyl glycol, polyethylene glycol, etc.). While other carbonate precursors will occur to those skilled in the art, carbonyl chloride, also known as phosgene, is preferred.

Also contemplated are polymeric components (a) comprising units of a dihydric phenol, a dicarboxylic acid and carbonic acid, such as disclosed in U.S. Pat. No. 3,169,121, incorporated herein by reference.

The aromatic carbonate polymers used as component (a) herein are prepared preferably by employing a molecular weight regulator, an acid acceptor and a catalyst. Suitable molecular weight regulators are phenol, cyclohexanol, methanol, p-t-butylphenol, p-bromophenol, and the like.

A suitable acid acceptor may be either organic or inorganic. Illustrative of the former are tertiary amines, such as pyridine, triethylamine, dimethylaniline, tributylamine, and the like. Inorganic acid acceptors can comprise a hydroxide, a carbonate, a bicarbonate, a phosphate, or the like, of an alkali- or an alkaline earth metal.

Conventional additives, such as anti-static agents, pigments, mold release agents, thermal stabilizers, and the like can be present in component (a).

The fibrous reinforcing agent (b) can vary widely in nature and type, so long as it is "pristine", that is, essentially free of any sizing materials, as mentioned above. There can be used glass fibers, mineral fibers, such as rockwool, asbestos, and the like, carbon fibers, and others. Preferred are glass fibers and rockwool fibers.

Like the above mentioned U.S. Pat. No. 4,147,707, suitable fibers, e.g., glass fibers, are all the commercially available kinds and types, such as cut glass filaments (long glass fiber and short glass fiber), rovings and staple fibers.

The length of the filaments, whether or not they have been bundled to form fibers, should be between about 60 mm and 6 mm, for long fibers and between about 5 mm and 0.05 mm in the case of short fibers. Alkali-free aluminum-boron-silicate glass ("E" glass) or alkali containing glass ("C" glass) can be used, as well as others. Preferred is a ground short glass fiber.

Any of the hydrogen polysiloxanes known in the art can serve as component (c). Especially useful are those set forth by formula in the above-mentioned U.S. Pat. No. 3,971,756. The patent also cites U.S. Pat. Nos. 2,445,794; 2,448,756; 2,484,595 and 3,514,424 as showing ways of making such siloxanes. To save unnecessarily detailed description, these are all incorporated herein by reference. Most important members of the family are those in which R is methyl, or phenyl, or a mixture thereof. These are commercially available. At the present time, it is preferred to use poly(methyl hydrogen)siloxane, a fluid which is available commercially from General Electric Company under the trade designation DF-1040.

In some embodiments, it is contemplated to use a small amount, e.g., up to 10 parts by weight per 100 parts by weight of (a), (b) and (c) combined, of an impact modifier. This can comprise a polyacrylate, or a copolymer of a diene and acrylonitrile and/or vinyl aromatic compound. A preferred such modifier is a block copolymer, of the linear or radial type, comprising diene rubber center blocks and vinyl aromatic terminal blocks. Illustrative dienes are butadiene or isoprene, and illustrative vinyl aromatics are styrene, vinyl toluene, and the like. Especially suitable are selectively hydrogenated such compounds. Particularly valuable are the selectively hydrogenated linear ABA types, made from styrene (A) and butadiene (B), and sold by Shell Chemical under the tradename Kraton G, and the corresponding radial teleblocks sold by Phillips Chemical under the tradename Solprene.

Any conventional method can be used to formulate the present thermoplastic compositions, and to mold them. The important factor is to insure intimate admixture. The amounts of components (a), (b) and (c) and, optionally (d) to be used have been broadly set forth above. Preferably, however, the siloxane will be present in an amount of from about 0.05 to less than 0.5, and especially preferably, about 0.4 parts, by weight per 100 parts by weight of (a), (b) and (c) combined. Especially preferably the fibrous reinforcing agent will be present in an amount of from about 15 to about 40 parts by weight per 100 parts by weight of (a), (b) and (c) combined. Mixing temperatures and molding temperature will be illustrated in the following examples, but, in any event, will be entirely in harmony with those well known to those skilled in the art of polycarbonate resin technology.

DESCRIPTION OF THE PREFERRED EMBODIMENTS

The following examples illustrate the compositions of the present invention. They are not to be construed to limit the claims in any manner whatsoever.

EXAMPLES 1-3

Polycarbonate compositions are prepared by extruding a homopolymer of 2,2-bis(4-hydroxyphenyl) propane (bisphenol-A) and phosgene (LEXAN® 125), either short milled glass fibers or short milled rockwoolmineral fibers, both essentially free of any sizing agent, and, where indicated, a polymethyl hydrogen siloxane fluid (DF1040, General Electric Company). For comparison purposes, a polydimethyl siloxane fluid (SF-18, General Electric Company) is also employed. Extrusion is carried out at 265° C., and the extrudate is comminuted into pellets.

The pellets are then injection molded at about 315° C. (cylinder), into standard physical test specimens, so that heat distortion temperature (HDT) can be measured according to standard test methods; Izod impact strength, notched and unnotched can be measured on ⅛" bars according to standard test methods; falling ball impact strength can be measured on a 10 cm round disc according to standard test methods elastic modulus and tensile yield strength and elongation at yield and at break can be measured according to standard test methods.

The compositions used, and the properties observed are set forth in Table 1:

TABLE 1

Short Fiber Reinforced Polycarbonate Compositions

| | \multicolumn{7}{c}{Example} |
|---|---|---|---|---|---|---|---|
| | 1 | 1A* | 1B* | 2 | 2A* | 3 | 3A* |
| Composition(parts by weight) | | | | | | | |
| poly(bisphenol-A carbonate)[a] | 70 | 70 | 70 | 80 | 80 | 80 | 80 |
| short unsized glass fibers[b] | 30 | 30 | 30 | 20 | 20 | — | — |
| short unsized rockwool fibers[c] | — | — | — | — | — | 20 | 20 |
| poly(methyl hydrogen)siloxane[d] | 0.4 | — | — | 0.4 | — | 0.4 | — |
| poly(dimethyl) siloxane[e] | — | — | 0.4 | — | — | — | — |
| Properties | | | | | | | |
| heat distortion temp., °C. at 1.82 N/mm$^2$ | 143 | 143 | 143 | 142 | 142 | 141 | 142 |
| Izod impact, notched, J/m. | 152 | 53 | 74 | 180 | 70 | 150 | 60 |
| Izod impact, unnotched, J/m. | NB** | 350 | 340 | NB | 520 | NB | 600 |
| Falling ball impact, J 10kg. dart, 10φ cm | 55 | <5 | <5 | 110 | <5 | 55 | <5 |
| E modulus, N/mm$^2$ | 5100 | 5250 | 5300 | 3600 | 3250 | 3950 | 4000 |
| Tensile strength at yield,N/mm$^2$ 0.5 cm/min. | 43.5 | 66.0 | 63.0 | 48.5 | 63.0 | 55.0 | 68.0 |
| Elongation at yield, % | 7 | — | — | 7.5 | — | 7.0 | — |

TABLE 1-continued

Short Fiber Reinforced Polycarbonate Compositions

| | \multicolumn{7}{c}{Example} |
|---|---|---|---|---|---|---|---|
| | 1 | 1A* | 1B* | 2 | 2A* | 3 | 3A* |
| break, % | 18 | 3.5 | 3.5 | 25 | 5.0 | 28 | 4.0 |

*Control
**NB - did not break
[a]LEXAN® 125 General Electric Co.
[b]EC 10W from Gevetex Co.
[c]Fix Spinrock from Rockwool Kapinus Co.
[d]DF1040, General Electric Company
[e]SF18, General Electric Company In all cases, ductile impact strength was enormously increased upon the addition of the siloxane fluid, except when the siloxane fluid did not contain silicon-hydrogen bonds (Control 1B). There is no significant loss in tensile modulus, and also no loss in heat distortion temperature.

EXAMPLE 4

The general procedure of Examples 1-3 is repeated, increasing the amount of hydrogen siloxane fluid, and determining, in addition, Vicat softening temperature, melt viscosity, and gasoline resistance. For comparison purposes, a composition is also made omitting the siloxane fluid. The compositions used and the results obtained are set forth in Table 2.

TABLE 2

Short Fiber Reinforced Polycarbonate Compositions

| | \multicolumn{2}{c}{Example} |
|---|---|---|
| | 4 | 4A* |
| Composition(parts by weight) | | |
| poly(bisphenol-A)carbonate[a] | 80 | 80 |
| short unsized glass fibers[b] | 20 | 20 |
| poly(methyl hydrogen siloxane)[d] | 0.5 | — |
| Properties | | |
| Vicat B(120/50N) | 148 | 148 |
| Melt viscosity, 300° C. | 450 | 400 |
| Heat distortion temperature, °C. | 143 | 142 |
| Tensile modulus, N/mm$^2$ | 3600 | 3750 |
| Tensile strength, N/mm$^2$ | 48.5 | 63.0 |
| Elongation at break, % | 30 | 5 |
| Time to failure in gasoline at 1% strain | 17 min. | 60 min. |
| Whitening in gasoline | yes | yes |
| Izod impact, notched, J/m. | 220 | 70 |
| Izod impact, unnotched, J/m. | NB** | 520 |
| Falling ball impact, J, 10 kg; h = var.; φ10 cm disc, w = 3.2 mm φ9.5 cm support ring | 120 | <5 |

*Control
**NB — did not break
[a]see footnote to Table 1
[b]see footnote to Table 1
[d]see footnote to Table 1

The ductile impact strength is again seen to be markedly increased.

Obviously many variations are possible in light of the above, detailed description. For example, the bisphenol-A polycarbonate can be substituted with a polycarbonate from tetramethylbisphenol-A. The poly(methyl hydrogen) siloxane can be substituted with a poly(phenyl hydrogen)siloxane. Instead of short glass fibers, unsized long glass fibers can be substituted. An impact improving amount, e.g., 5% by weight, of a selectively hydrogenated block copolymer of styrene-butadiene-styrene, e.g., Shell's Kraton G, can be included in the composition. For the polycarbonate, there can be substituted polyester carbonate, polycarbonate siloxane copolymers and blends thereof. All such obvious variations are within the full intended scope of the appended claims.

I claim:

1. A high impact strength, high modulus thermoplastic composition consisting essentially of per 100 parts by weight (a), (b) and (c), an intimate admixture of:
   (a) from about 95 to about 35 parts by weight of an aromatic carbonate polymer of copolymer;
   (b) from about 5 to about 65 parts by weight of fibrous reinforcing agent essentially free of any sizing agent; and
   (c) from about 0.05 to about 4 parts by weight of hydrogen siloxane comprising units of the formula

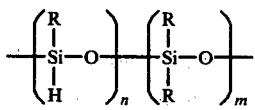

wherein R is hydrogen, $C_1$–$C_{10}$ alkyl, phenyl or a mixture of any of the foregoing, and n plus m is at least about 4.

2. A composition as defined in claim 1 wherein the siloxane is present in an amount of from about 0.05 to less than 0.5 parts by weight per 100 parts by weight of (a), (b) and (c), combined.

3. A composition as defined in claim 1 wherein the siloxane is present in an amount of about 0.4 parts by weight per 100 parts by weight of (a), (b) and (c) combined.

4. A composition as defined in claim 1 wherein the aromatic carbonate polymer is the reaction product of 2,2-bis(4-hydroxyphenyl)propane and of phosgene.

5. A composition as defined in claim 1 wherein the aromatic carbonate polymer is the reaction product of 2,2-bis(4-hydroxy-3,5-dimethylphenyl)propane and of phosgene.

6. A composition as defined in claim 1 wherein the fibrous reinforcing agent comprises glass fibers or rock wool fibers.

7. A composition as defined in claim 6 wherein the fibrous reinforcing agent comprises glass fibers.

8. A composition as defined in claim 7 wherein the glass fibers are short glass fibers of from about 0.05 mm. to about 5 mm. in length.

9. A composition as defined in claim 1 wherein the fibrous reinforcing agent is present in an amount of from about 15 to about 40 parts by weight per 100 parts by weight of (a), (b) and (c) combined.

10. A composition as defined in claim 1 which also includes (d) from a small effective amount up to about 10 parts by weight of an impact strength improving modifying agent per 100 parts by weight of (a), (b) and (c), combined.

11. A composition as defined in claim 10 wherein impact modifying agent (d) comprises a selectively hydrogenated block copolymer of the A-B-A type wherein units A are polymerized vinyl aromatic units and centerblock units B comprise polymerized diene units.

12. A composition as defined in claim 11 wherein the A units are polymerized styrene units and the B units are polymerized butadiene units.

* * * * *